United States Patent
Kristen et al.

US006359086B1

(10) Patent No.: US 6,359,086 B1
(45) Date of Patent: Mar. 19, 2002

(54) NON SELF-IGNITING SOLID

(75) Inventors: Marc Oliver Kristen, Limburgerhof; Patrik Müller, Kaiserslautern; Ulrich Moll, St Martin; Peter Kölle, Bad Dürkheim, all of (DE)

(73) Assignee: Basell Polyolefine GmbH, Kehl (DE)

( * ) Notice: Subject to any disclaimer, the term of this patent is extended or adjusted under 35 U.S.C. 154(b) by 0 days.

(21) Appl. No.: 09/341,517

(22) PCT Filed: Jan. 15, 1998

(86) PCT No.: PCT/EP98/00200

§ 371 Date: Jul. 13, 1999

§ 102(e) Date: Jul. 13, 1999

(87) PCT Pub. No.: WO98/33591

PCT Pub. Date: Aug. 6, 1998

(30) Foreign Application Priority Data

Jan. 31, 1997 (DE) .......................... 197 03 502

(51) Int. Cl.$^7$ .................................. C08F 4/42
(52) U.S. Cl. ............ 526/160; 526/156; 526/129; 526/348; 526/943; 502/104; 502/107
(58) Field of Search ............... 526/160, 129, 526/156, 348, 943; 502/104, 107

(56) References Cited

U.S. PATENT DOCUMENTS 5,616,665 A  4/1997  Jejelowo et al.

FOREIGN PATENT DOCUMENTS

| WO | WO 87/03889 | * 7/1987 |
| WO | 87/03889 | 7/1987 |
| WO | 93/23430 | 11/1993 |
| WO | WO 93/23439 | * 11/1993 |
| WO | 94/28034 | 12/1994 |
| WO | 95/07939 | 3/1995 |
| WO | 96/14155 | 5/1996 |
| WO | 97/31029 | 8/1997 |

* cited by examiner

*Primary Examiner*—David W. Wu
*Assistant Examiner*—Ling-Siu Choi
(74) *Attorney, Agent, or Firm*—Keil & Weinkauf

(57) ABSTRACT

A free-flowing solid which does not self-ignite, comprising:
 a) at least one support component,
 b) at least one chemical compound which per se is self-igniting,
 c) at least one inert liquid and
 d) further components.

8 Claims, No Drawings

NON SELF-IGNITING SOLID

The present invention relates to a solid which does not self-igniting, comprising:
- a) at least one support component,
- b) at least one chemical compound which per se is self-igniting,
- c) at least one inert liquid and
- d) further components if desired.

The present invention additionally relates to processes for preparing a solid which does not self-ignite and to the use of such a solid for catalytic or stoichiometric carbon-carbon bond linking or for hydrogenation.

It has long been known, and is frequently desirable, to fix reactive, chemical compounds chemically or physically on support materials and thereby to enhance their suitability for particular chemical processes. Examples of important industrial-scale chemical processes are polymerization, hydrogenation or the drying of fluids, for example liquids or gases.

In polymerization processes, for example, especially in the production of polyolefins, use is made of solid, support-bound Ziegler, Phillips or metallocene catalyst systems. A common feature of these catalysts is that they include generally pyrophoric constituents, with the result that the catalysts may spontaneously ignite, especially under oxidizing conditions, for example on the ingress of air.

The self-ignitability of the solids, demonstrated by way of example in polyolefin catalysts, hinders or even prevents totally their use in large-scale industrial processes, since for safe working it necessitates special protective measures, which are often expensive and technically complex.

In addition, the classification of these solids, especially the polyolefin catalysts, as self-igniting substances greatly limits their transportation; for example, rapid despatch by air freight is not permitted.

WO 95/07939, WO 87/03889, WO 93/23439 and WO 94/28034 disclose the preparation of support-bound metallocene catalysts in suspension, subsequent removal of the solvent and drying of the solid to give a free-flowing catalyst. WO 93/23439 specifies drying as an essential step to obtain catalysts having advantageous properites. The dried catalysts of the prior art have the disadvantage that they are self-igniting.

Wetting of the dry solids, especially the polymerization catalysts, leads in general to unwanted properties in the catalysts, such as reduced polymerization activity, or formation of lumps which are difficult to meter.

It is an object of the present invention, therefore, to provide solids, especially flowable polyolefin catalysts, which are not self-igniting and which are virtually unimpaired in their other relevant properties.

We have found that this object is achieved by a solid which does not self-ignite, comprising:
- a) at least one support component,
- b) at least one chemical compound which per se is self-igniting,
- c) at least one inert liquid and
- d) further components if desired.

This solid is referred to below as "novel solid". We have also found a process for preparing a novel solid where the components a) to d) are mixed and then some of component c) is removed. We have also found a process for preparing a novel solid where components a) to d) are mixed, then virtually all of component c) is removed, and then a component c) is added to the dry solid again in an amount such that this solid does not self-ignite. We have also found that the novel solid can be used for catalytic or stoichiometric carbon-carbon bond linkage or for hydrogenation or drying of liquids.

There is broad scope for variation in the support component a). All organic or inorganic solids are suitable in general, especially those that are porous. Examples of particularly suitable inorganic support components a) are particulate oxides or salts. Examples of particularly suitable organic support components a) are particulate polymers.

Examples of particulate organic support material a) are polyolefins such as polyethylene, polypropylene, poly-1-butene and polymethyl-1-pentene and copolymers with the monomers on which these polymers are based, and also polyesters, polyamides, polyvinyl chloride, polyacrylates, polymethacrylates and polystyrene. However, preference is given to particulate inorganic support materials a), such as porous oxides, for example $SiO_2$, $Al_2O_3$, MgO, $ZrO_2$, $TiO_2$, $B_2O_3$, CaO and ZnO. Metal halides, such as $MgCl_2$, are other suitable supports. The support materials a) preferably have a particle diameter of from 1 to 300 μm, in particular from 30 to 70 μm. Examples of particularly preferred supports are silica gels, preferably those of the formula $SiO_2 \cdot aAl_2O_3$, in which a is a number in the range from 0 to 2, preferably from 0 to 0.5; ie. aluminosilicates or silicon dioxide. Products of this kind are obtainable commercially, for example Silica Gel 332 from Grace.

There is likewise broad scope for variations in the component b) which per se is self-igniting and is defined by its property of self-ignition. Self-ignition is defined by the UN Recommendations Section 14.3 and EEC Directive 92/69, A 13, as described at length in the Examples. Examples of compounds which fall within this definition are organometallic compounds, metal hydrides or organometal hydrides, principally those of groups 1, 2, 3, 4, 5, 6, 12, 123, 13, 14 and 15 of the Periodic Table of the Elements (group numbering in accordance with the 1985 IUPAC Recommendation). Examples of particularly suitable components b) are lithium organyls, aluminum organyls and boron organyls. Preference is given to open-chain or cyclic alumoxane compounds which according to U.S. Pat. No. 4,794,096 can be obtained by reacting aluminum trialkyls with water. They are composed of from 5 to 30 structural units $-\!\!\!-\!\![O\,Al(R^1)]\!-\!\!\!-$ connected in chain form or cyclic form, in which each $R^1$ is a $C_1$–$C_4$-alkyl, preferably methyl or ethyl. The alumoxane compounds can also be present in a mixture with other metal alkyls, preferably with aluminum alkyls.

Also used are aluminum organyls of the formula $Al(R')_3$, in which R' is hydrogen, $C_1$–$C_{10}$-alkyl, preferably $C_1$–$C_4$-alkyl, especially methyl, ethyl or butyl. R' can also be arylalkyl or alkylaryl each of 1 to 10 carbons in the alkyl and 6 to 20 carbons in the aryl. Also suitable are aluminum alkyls $Al(R')_3$ in which R' can be fluorine, chlorine, bromine or iodine, with the proviso that at least one radical R' is a C-organic radical or hydrogen. Particularly preferred compounds are trimethylaluminum, triethylaluminum, triisobutylaluminum, diisobutylaluminum hydride and diethylaluminum chloride.

The components b) can be employed alone or as mixtures in the novel solid, the proportions of the mixture not being critical.

The components b) are generally applied by impregnating the support solid with the liquid and/or dissolved components b). Solvents suitable for this purpose are in general those which constitute component c). Component c) is an inert liquid, in other words a chemical compound which is liquid under standard conditions and which under standard conditions does not undergo, or undergoes only very slowly, chemical reaction with component b), with partial or complete chemical conversion of component b), in general decomposition, or with its own partial or complete chemical conversion. Partial chemical conversion is generally not the case until more than about 10 mol-%, preferably 3 mol-% and, in particular, 1 mol-% of the pure substance c) employed has been converted.

Highly suitable compounds for use as component c) are inert organic compounds such as aliphatic, isocyclic or aromatic hydrocarbon carbons. Examples are n-hexane, n-heptane, n-octane, isododecane, cyclohexane, toluene, ethylbenzene, 1-hexene, 1-pentene, 1-heptene and 1-octene, preferably n-heptane. It is of course also possible to use mixtures or isomers of these compounds as component c), especially those which are offered commercially, such as EC 180 from Shell or Isopar from Exxon.

The content of the liquid c) in the novel solid comprising a) to c) and optionally d) is such that c) is just no longer self-igniting but is still flowable, ie. contains virtually no coarse components. In accordance with our current state of knowledge, the amount of the liquid c) depends inter alia on the propensity to self-ignition of component b).

The novel solid usually comprises from 10 to 70% by weight, based on the solid not containing c), of c), preferably from 25 to 60% by weight and, in particular, from 30 to 40% by weight of c), as determined by the method of gas chromatography.

Polymerization catalysts, preferably olefin polymerization catalysts, based on the novel solid normally comprise a transition metal component d) as well.

Examples of particularly suitable transition metal components d) are the halides, preferably the chlorides, or alkoxides, preferably methoxides, ethoxides or isopropoxides, of the transition metals titanium, zirconium, hafnium, vanadium, niobium, tantalum, chromium, molybdenum and tungsten. Very particularly preferred components d) are metallocene complexes, ie. transition metal compounds having at least one cyclopentadienyl ligand or at least one ligand derived from the cyclopentadienyl structural unit.

Particularly suitable metallocene complexes are those of the formula I

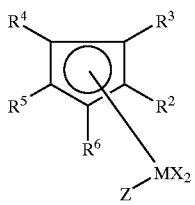

I where
  M is titanium, zirconium, hafnium, vanadium, niobium or tantalum,
  X is fluorine, chlorine, bromine, iodine, hydrogen, $C_1$–$C_{10}$-alkyl, $C_6$–$C_{15}$-aryl, alkylaryl having 1 to 10 carbons in the alkyl and 6 to 20 carbons in the aryl, —$OR^7$ or —$NR^7R^8$, where
    $R^7$ and $R^8$ are $C_1$–$C_{10}$-alkyl, $C_6$–$C_{15}$-aryl, alkylaryl, arylalkyl, fluoroalkyl or fluoroaryl each of 1 to 10 carbons in the alkyl and 6 to 20 carbons in the aryl,
  $R^2$ to $R^6$ are hydrogen, $C_1$–$C_{10}$-alkyl, 5- to 7-membered cycloalkyl which in turn may carry a $C_1$–$C_{10}$-alkyl as substituent, $C_6$–$C_{15}$-aryl or arylalkyl, where two adjacent radicals may together be saturated or unsaturated cyclic groups of 4 to 15 carbons, or are $Si(R^9)_3$ where
  $R^9$ is $C_1$–$C_{10}$-alkyl, $C_3$–$C_{10}$-cycloalkyl or $C_6$–$C_{15}$-aryl,

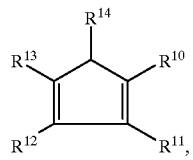

Z is X or
  where
    $R^{10}$ to $R^{14}$ are hydrogen, $C_1$–$C_{10}$-alkyl, 5- to 7-membered cycloalkyl which may in turn carry a $C_1$–$C_{10}$-alkyl as substituent, $C_6$–$C_{15}$-aryl or arylalkyl and where two adjacent radicals together may be saturated or unsaturated cyclic groups of 4 to 15 carbons, or are $Si(R^{15})_3$ where
  $R^{15}$ is $C_1$–$C_{10}$-alkyl, $C_6$–$C_{15}$-aryl or $C_3$–$C_{10}$-cycloalkyl,
  or where the radicals $R^5$ and Z together form a group —$R^{16}$—A— in which

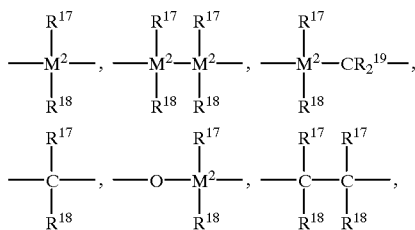

$R_{16}$ is
  =$BR^{17}$, =$AlR^{17}$, —Ge—, —Sn—, —O—, —S—, =SO, =$SO_2$, =$NR^{17}$, =CO, =$PR^{17}$ or =$P(O)R^{17}$,
where
  $R^{17}$, $R^{18}$ and $R^{19}$ are identical or different and are hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl or where two adjacent radicals in each case with the atoms linking them form a ring, and
  $M^2$ is silicon, germanium or tin,
A

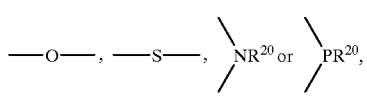

where
  $R^{20}$ is $C_1$–$C_{10}$-alkyl, $C_6$–$C_{15}$-aryl, $C_3$–$C_{10}$-cycloalkyl, alkylaryl or $Si(R^{21})_3$,
  $R^{21}$ is hydrogen, $C_1$–$C_{10}$-alkyl, $C_6$–$C_{15}$-aryl which may in turn be substituted by $C_1$–$C_4$-alkyl, or is $C_3$–$C_{10}$-cycloalkyl
or where the radicals $R^5$ and $R^{13}$ together form a group —$R^{16}$—. of the metallocene complexes in formula I, preference is given to

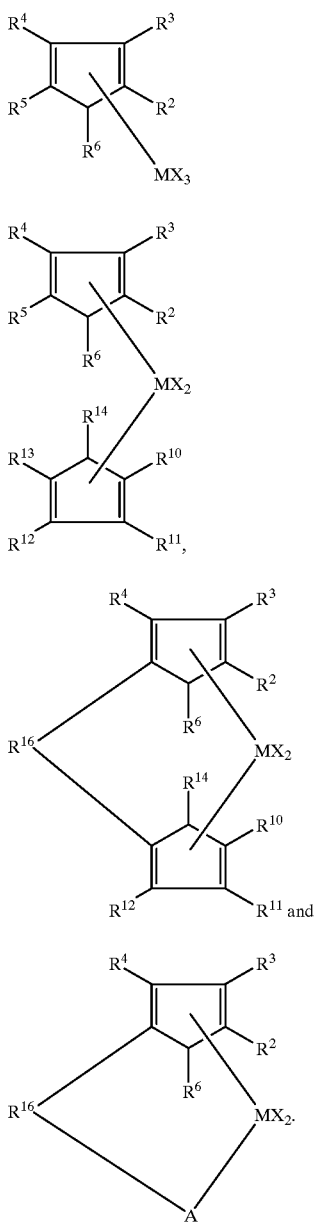

Ia

Ib

Ic

Id

Preference is given to those transition metal complexes which contain as ligands two, possibly bridged, aromatic ring systems, ie. in particular the transition metal complexes of the formulae Ib and Ic.

The radicals X can be identical or different but are preferably identical.

Of the compounds of the formula Ia, particular preference is given to those where M is titanium, zirconium or hafnium,
X is chlorine, $C_1$–$C_4$-alkyl or phenyl, and
$R^2$ to $R^6$ are hydrogen or $C_1$–$C_4$-alkyl.

Of the compounds of the formula Ib, in those which are preferred

M is titanium, zirconium or hafnium,
X is chlorine, $C_1$–$C_4$-alkyl or phenyl,
$R^2$ to $R^6$ are hydrogen, $C_1$–$C_4$-alkyl or $Si(R^9)_3$ and
$R^{10}$ to $R^{14}$ are hydrogen, $C_1$–$C_4$-alkyl or $Si(R^{15})_3$.

Particularly suitable compounds are those of the formula Ib in which the cyclopentadienyl radicals are identical.

Examples of particularly suitable compounds include:

bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride and also the corresponding dimethylzirconium compounds.

Of the compounds of the formula Ic, particular suitability is possessed by those where $R^2$ and $R^{10}$ are identical and are hydrogen or $C_1$–$C_{10}$-alkyl,
$R^6$ and $R^{14}$ are identical and are hydrogen, methyl, ethyl, isopropyl or tert-butyl,
$R^3$, $R^4$, $R^{11}$ and $R^{12}$ are defined as follows:
$R^4$ and $R^{12}$ are $C_1$–$C_4$-alkyl,
$R^3$ and $R^{11}$ are hydrogen,
or two adjacent radicals $R^3$ and $R^4$ and $R^{11}$ and $R^{12}$ together are cyclic groups of 4 to 12 carbons,
$R^{16}$ is

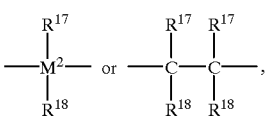

M is titanium, zirconium or hafnium and
X is chlorine, $C_1$–$C_4$-alkyl or phenyl.

Examples of particularly suitable complex compounds include dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)-zironium dichloride,
dimethylsilanediylbis(3-tert-butyl-5-ethylcyclopentadienyl)-zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)-zirconium dichloride,
dimethylsilanediylbis(3-ethyl-5-isopropylcyclopentadienyl)-zirconium dichloride,
dimethylsilanediylbis(2-methylindenyl)zirconium dichloride,
dimethylsilanediylbis(2-methylbenzindenyl)zirconium dichloride
dimethylsilanediylbis(2-ethylbenzindenyl)zirconium dichloride, methylphenylsilanediylbis(2-ethylbenzindenyl)zirconium dichloride,
methylphenylsilanediylbis(2-methylbenzindenyl)zirconium dichloride,
diphenylsilanediylbis(2-methylbenzindenyl)zirconium dichloride,
diphenylsilanediylbis(2-ethylbenzindenyl)zirconium dichloride,
and dimethylsilanediylbis(2-methylindenyl)hafnium dichloride and also the corresponding dimethylzirconium compounds.

Of the compounds of the formula Id, those which are to be mentioned as being particularly suitable are those where M is titanium or zirconium, X is chlorine, $C_1$–$C_4$-alkyl or phenyl, $R^{16}$ is

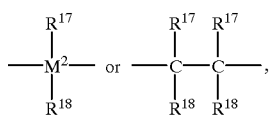

A is

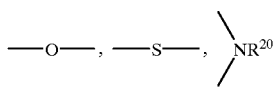

and $R^2$ to $R^4$ and $R^6$ are hydrogen, $C_1$–$C_{10}$-alkyl, $C_3$–$C_{10}$-cycloalkyl, $C_6$–$C_{15}$-aryl or $Si(R^9)_3$, or where two adjacent radicals are cyclic groups of 4 to 12 carbons.

Complex compounds of this kind can be synthesized by methods known per se, with preference being given to the reaction of the appropriately substituted, cyclic hydrocarbon anions with halides of titanium, zirconium, hafnium, vanadium, niobium or tantalum.

Examples of corresponding preparation techniques are described, inter alia, in the Journal of organometallic Chemistry, 369 (1989), 359–370.

It is also possible to employ mixtures of different metallocene complexes.

The novel solid, and especially the polymerization catalysts based on it, may additionally include, as component d), a compound which forms metallocenium ions. This can be selected either from the group of the compounds b), preferably aluminoxanes and especially methylaluminoxane, or from the group of the following compounds, if desired in addition to b).

Suitable compounds which form metallocenium ions are strong, neutral Lewis acids, ionic compounds with Lewis-acid cations, and ionic compounds with Brönsted acids as cation.

Preferred strong, neutral Lewis acids are compounds of the formula II $$M^3X^1X^2X^3 \qquad \text{II}$$

where $M^3$ is an element from main group III of the Periodic Table, especially B, Al, Ga preferably B, and $X^1$, $X^2$ and $X^3$ are hydrogen, $C_1$- to $C_{10}$-alkyl, $C_6$- to $C_{15}$-aryl, alkylaryl, arylalkyl, haloalkyl or haloaryl each having 1 to 10 carbons in the alkyl and 6 to 20 carbons in the aryl, or are fluorine, chlorine, bromine or iodine, and in particular are haloaryls, preferably pentafluorophenyl.

Particularly preferred compounds of the formula II are those in which $X^1$, $X^2$ and $X^3$ are identical, preference being given to tris(pentafluorophenyl)borane.

Suitable ionic compounds with Lewis-acid cations are compounds of the formula III $$[(Y^{a+})Q_1Q_2 \ldots Q_z]^{d+} \qquad \text{III}$$

where

Y is an element from main groups I to VI or from subgroups I to VIII of the Periodic Table, $Q_1$ to $Q_z$ are radicals with a single negative charge such as $C_1$–$C_{28}$-alkyl, $C_6$–$C_{15}$-aryl, alkylaryl, arylalkyl, haloalkyl or haloaryl each of 6 to 20 carbons in the aryl and 1 to 28 carbons in the alkyl, or are $C_1$–$C_{10}$-cycloalkyl which may be substituted by $C_1$–$C_{10}$-alkyls, or are halogen, $C_1$–$C_{28}$-alkoxy, $C_6$–$C_{15}$-aryloxy, silyl or mercaptyl groups, a is an integer from 1 to 6, z is an integer from 0 to 5, and d corresponds to the difference a–z but is greater than or equal to 1.

Carbonium cations, oxonium cations, and sulfonium cations, and cationic transition metal complexes, are particularly suitable. Particular mention may be made of the triphenylmethyl cation, the silver cation and the 1,1'-dimethylferrocenyl cation. They preferably possess noncoordinating counterions, especially boron compounds as are specified in WO 91/09882, preferably tetrakis (pentafluorophenyl) borate.

Ionic compounds with Brönsted acids as cations and preferably likewise noncoordinating counterions are specified in WO 91/09882; a preferred cation is N,N-dimethylanilinium.

Suitable processes for preparing the novel solid are the following.

Support solid a), preferably a porous inorganic oxide, especially silica gel, is suspended in the inert liquid c), preferably an aliphatic, isocyclic or aromatic hydrocarbon, especially heptane and/or toluene. The component b), preferably an organometallic compound from group 3 of the Periodic Table of the Elements or an aluminoxane, as defined above, preferably methylaluminoxane, or else a mixture of components b) and d), which may also react chemically with one another, is added to the suspension. Components b) and, if desired, d) can also be present as solutions, preferably in inert organic solvents, such as aliphatic, isocyclic hydrocarbons or aromatic hydrocarbons, ie. n-hexane, n-heptane, isododecane, toluene or ethylbenzene. The temperatures for this reaction are not critical. Components a), b) and c) and, if used, d) are usually reacted at from –70 to 120° C., preferably at from 0 to 50° C.

Subsequently, virtually all of the solvent c) can be removed and the solid which remains is dried, usually at from 20 to 120° C., and a defined amount of component c) is added (variant A), or else the amount of component c) in the novel solid can be established at the desired level by incomplete removal (variant B). The liquid c) added in variant A can, but need not, be chemically identical to the liquid c) originally present in the mixture.

A highly suitable process for preparing a solid polymerization catalyst, preferably for olefin polymerization, which is not self-igniting is the following.

Support solid a), preferably a porous inorganic oxide, especially silica gel, is suspended in the inert liquid c), preferably an aliphatic, isocyclic or aromatic hydrocarbon, especially heptane and/or toluene. Component b), preferably an organometallic compound from group 3 of the Periodic Table of the Elements, such as tri-$C_1$–$C_{10}$-alkylaluminum compounds, especially trimethylaluminum, or an aluminoxane, as defined above, preferably methylaluminoxane, is added to the suspension. Component b) can also be present as a solution, preferably in inert organic solvents, such as aliphatic, isocyclic hydrocarbons or aromatic hydrocarbons, ie. n-hexane, n-heptane, isododecane, toluene or ethylbenzene. The temperatures for this reaction are not critical. Components a), b) and c) are usually reacted at from −70 to 120° C., preferably from 0 to 50° C. After this impregnation process, it is common to remove virtually all of the solvent and to dry any solid which remains, preferably at from 20 to 120° C., in particular at from 40 to 80° C. The drying period is generally not critical and as a rule is in the range from 0.1 to 24 hours, depending on batch size.

The solid obtainable in this way is then usually mixed with a solution of the metallocene, preferably of the biscyclopentadienyl compounds Ib, Ic as defined above, especially bis(n-butylcyclopentadienyl)zirconium dichloride, bis(isobutylcyclopentadienyl)zirconium dichloride, dimethylsilanediylbis(indenyl)zirconium dichloride, dimethylsilanediylbis(2-methylbenzoinindenyl)zirconium dichloride, and with the metallocenium-forming compound, preferably methylaluminoxane. Subsequently, the solvent c) is normally removed almost completely, the solid which remains is dried, preferably at from 20 to 120° C., in particular from 40 to 80° C., and a defined amount of component c) is added (variant A) or else the amount of component c) in the novel solid can be established at the desired level by incomplete removal of component c) (variant B). The liquid c) added in variant A can, but need not, be chemically identical to the liquid c) originally present in the mixture.

The solid catalysts obtainable in this way are highly suitable for polymerizing $C_2$–$C_{12}$-alk-1-enes at from −50 to 300° C. under pressures in the range from 0.5 to 5000 bar.

Of the $C_2$–$C_{12}$-alk-1-enes, preference is given to ethylene, propene, 1-butene, 1-pentene, 4-methyl-1-pentene, 1-hexene, 1-heptene and 1-octene and to mixtures of these $C_2$–$C_{12}$-alk-1-enes. Particular preference is given to homo- or copolymers of propene, the proportion of propene in the copolymers being at least 50 mol-%. Of the propene copolymers, those which are preferred include ethylene or 1-butene or mixtures thereof as additional monomers. Preferred ethylene polymers are copolymers with a proportion of from 50 to 99.9 mol-% of ethylene and from 0.1 to 50 mol-% of a $C_3$–$C_{10}$-alk-1-ene such as propene, 1-butene, 1-hexene, 1-octene, 1-decene or a mixture of these $C_3$–$C_{10}$-alk-1-enes, the proportions in the mixture not being critical.

The process for preparing polymers is usually conducted at from −50 to 300° C., preferably at from 0 to 150° C., and at pressures in the range from 0.5 to 5000 bar, preferably from 1 to 80 bar.

The polymerization can be accomplished in solution, in suspension, in liquid monomers or in the gas phase. Polymerization is preferably effected in liquid monomers, in suspension or in the gas phase, preference being given to the stirred gas phase or to the gas-phase fluidized-bed technique.

The process can be carried out continuously or batchwise. Suitable reactors include continuously operated stirred vessels or fluidized-bed reactors; alternatively, if desired, a row of series-connected reactors (reactor cascade) can be used.

The novel solid is notable for its lack of self-ignitability, which has been defined in accordance with the UN Recommendations Section 14.3 and EEC Directive 92/69, A 13. In accordance with these recommendations, the storage of small amounts of the novel solid in air is investigated. If it has not self-ignited within five minutes, it is classified as not self-igniting.

The novel solid, preferably consisting of components a), b) and c), can be used to dry fluids. Examples of these fluids are monomers, such as the above-defined $C_2$–$C_{2}$–$_{12}$-alk-1-enes, for example ethylene, propylene, 1-butene and 1-hexene, and also organic solvents, such as those which constitute component c), examples being n-heptane and toluene. Gaseous fluids are the noble gases, preferably argon, and also nitrogen and gaseous hydrocarbons, for example propane and butane.

EXAMPLES

Example 1

Preparing a Dry, Supported Catalyst

In a dry reactor which has been flushed with nitrogen, 12.1 kg of silica gel (Grace, SG 332, 50 μm) are suspended in 90 l of heptane and adjusted to 20° C. under thermostatic control. Over a period of 90 minutes, 33.9 l of a 1 molar solution of trimethylaluminum (TMA) in heptane are added, in the course of which the temperature does not exceed 40° C. After the end of the addition of TMA, stirring was continued for 4 h. The suspension was filtered and the solid product washed with twice 20 l of heptane. After drying at 50° C., the modified support remained as a flowable powder with an aluminum content of 12% by weight.

12.6 kg of the modified support are added at 20° C. and after stirring for 20 minutes to a solution of 131.3 g of bis(n-butylcyclopentadienyl)zirconium dichloride in 56 l of 1.53 g molar methylaluminoxane solution in toluene, and the mixture is stirred for a further 45 minutes. It is then filtered and the solid product is subsequently washed with twice 20 l of heptane. After drying at 50° C., a flowable powder (15.1 kg) was obtained having an aluminum content of 12.7% by weight and a zirconium content of 0.078% by weight. Accordingly, the overall molar ratio Al to Zr was 550:1.

Example 2

Preparing Heptane-moist Catalysts a) by adding heptane

The appropriate amount of heptane (see Table 1) was added with stirring to 10 g of a catalyst prepared as in Example 1. The mixture was subsequently stirred for 2 hours.

b) by controlled drying of the catalyst

The procedure of Example 1 was repeated except that the catalyst was dried not to completion but to a heptane content of 38% by weight.

The heptane content of the supported catalyst was determined by mixing the sample with toluene, adding ethylbenzene as internal standard and decomposing the mixture with methanol and with ice cooling. Heptane was then determined by gas chromatography.

Example 3

Flammability Testing

About 2 g of the supported catalyst (see Table 1) were poured rapidly onto a thermometer which was standing vertically in a glass beaker. The temperature change on decomposition of the catalyst was observed; the maximum temperature was obtained after about 1 minute (Table 1).

TABLE 1

Temperature change on decomposition of the supported catalyst

| Heptane content [in % by wt.] | Initial temp. [° C.] | Maximum temp. [° C.] | Temp. difference [° C.] |
|---|---|---|---|
| 0 | 23.8 | 85.5 | 61.7 |
| 9 | 24.7 | 52.1 | 27.4 |
| 17 | 22.1 | 47.7 | 25.6 |
| 23 | 22.4 | 37.3 | 14.9 |
| 38 | 21.5 | 33.0 | 11.5 |

Example 4

Tests for classification of the catalyst with a heptane content of 38% by weight in accordance with the UN Recommendations, Section 14.3 and EEC Directive 92/69, A 13, and also the recommendations of the UN committees of experts on the transport of dangerous goods:

a) Test for Self-ignitability

The catalyst did not self-ignite in small amounts in air for a period of five minutes. It is thus not a pyrophoric substance.

b) Test for self-ignition in the wire basket by the UNO method.

The catalyst was stored at 140° C. in a convection oven in cubic wire baskets of a) 10 cm and b) 2.5 cm edge length. It self-ignited in both experiments.

On the basis of the test results 4a and 4b the catalyst was classified in class 4.2 as defined in the recommendations of the UN committees of experts on the transport of dangerous goods, and to packaging class II. Consequently, transportation by air is permitted.

Comparison Example 4V

Tests for classification of the catalyst with a heptane content of 0% by weight in accordance with the UN Recommendations, Section 14.3 and EEC Directive 92/69, A 13, and the recommendations of the UN committees of experts on the transport of dangerous goods Test for Self-ignitability The catalyst self-ignited in small amounts in air within a period of five minutes. It is therefore a pyrophoric substance, and transportation by air is prohibited.

Example 5

A stirred 10 l steel autoclave was carefully flushed with nitrogen and conditioned to the polymerization temperature of 70° C., and then 4.5 l of isobutane were introduced. Then, 567 mg of supported catalyst with a heptane content of 38% by weight (from Example 2) were flushed in with a further 0.5 l of isobutane, and ethylene was injected to a total pressure of 38 bar. The pressure in the autoclave was kept constant by supplementary addition of ethylene. After 90 minutes, the polymerization was terminated by letting down the autoclave. 1230 g of polymer were obtained in the form of readily flowable pellets. The experimental data are given in Table 2.

Comparison Example 5V

The procedure of Example 5 was repeated except that 402 mg of supported catalyst with a heptane content of 0% by weight (from Example 1) were employed. The yield was 1380 g. For further data see Table 2.

Examples 6 to 8

The procedure of Example 5 was repeated except that the supported catalyst with heptane content of from 9 to 23% by weight were employed. The data are listed in Table 2.

TABLE 2

Polymerizing ethylene with dry and with heptane-moist supported catalysts

| Example | Heptane content [% by wt.] | Amount of catalyst [mg] | Yield of polyethylene [g] | Productivity [g/g][a] | η polyethylene [dl/g][b] |
|---|---|---|---|---|---|
| 5 | 38 | 567 | 1230 | 3550 | 3.87 |
| 5V | 0 | 402 | 1380 | 3400 | 3.78 |
| 6 | 9 | 400 | 1490 | 4000 | 3.51 |
| 7a[c] | 17 | 546 | 1480 | 3450 | 3.40 |
| 7b[c] | 17 | 559 | 1620 | 3500 | 3.55 |
| 8a[c] | 23 | 631 | 1760 | 3600 | 3.65 |
| 8b[c] | 23 | 658 | 1750 | 3500 | 3.51 |

[a] Productivity = Yield of polyethylene [g]: Amount of non-heptane-moist catalyst [g]
[b] Determined in accordance with DIN 53 733
[c] a = Addition of heptane to dry catalyst as in Example 2. b = Specific drying of the catalyst to the respective heptane content, as in Example 2.

We claim:

1. A process for polymerizing $C_2$–$C_{12}$-alk-1-enes at from −50 to 300° C. under pressures in the range from 0.5 to 5000 bar wherein a previously isolated, storable free-flowing solid which does not self-ignite is used as catalyst, the solid comprising:
   a) at least one support component,
   b) at least one chemical compound which is self-igniting,
   c) at least one inert liquid in a quantity of from 10 to 70% by weight, based on the solid not containing c), and
   d) further components.

2. A process for preparing a storable, non-self-igniting solid comprising:
   a) at least one support component,
   b) at least one chemical compound which is self-igniting,
   c) at least one inert liquid in a quantity of from 10 to 70% by weight, based on the solid not containing c), and
   d) further components,
wherein components a) to d) are mixed, then some of component c) is removed and finally a free-flowing solid which does not self-ignite is isolated.

3. A process for preparing a storable, non-self-igniting solid comprising:
   a) at least one support component,
   b) at least one chemical compound which is self-igniting,
   c) at least one inert liquid in a quantity of from 10 to 70% by weight, based on the solid not containing c), and
   d) further components,
wherein components a) to d) are mixed, virtually all of component c) is removed, then a component c) is added to the dry solid again and finally a free-flowing solid which does not self-ignite is isolated.

4. The process as claimed in claim 1, where component a) is selected from the group consisting of inorganic solids, inorganic oxides and organic polymers.

5. The process as claimed in claim 1, where component b) is selected from the group consisting of organometallic compounds and hydrides.

6. The process as claimed in claim 1, where component c) is selected from the group consisting of inert organic solvents.

7. The process as claimed in claim 1, where component d) is selected from the group consisting of transition metal complexes.

8. The process as claimed in claim 1, where the component d) is selected from the group of metallocene compounds.

* * * * *